US012763566B2

(12) United States Patent
Johansen et al.

(10) Patent No.: US 12,763,566 B2
(45) Date of Patent: Oct. 13, 2026

(54) DOUBLE-ACTING HIGH TENSION COMPRESSION JOINT

(71) Applicant: NEXANS, Courbevoie (FR)

(72) Inventors: Ben Kristian Johansen, Halden (NO); Robin Gustavsen, Sellebakk (NO); Mats Johansson, Stromstad (SE)

(73) Assignee: NEXANS, Courbevoie (FR)

( * ) Notice: Subject to any disclaimer, the term of this patent is extended or adjusted under 35 U.S.C. 154(b) by 61 days.

(21) Appl. No.: 17/428,404

(22) PCT Filed: Feb. 10, 2020

(86) PCT No.: PCT/EP2020/053353
§ 371 (c)(1),
(2) Date: Oct. 10, 2022

(87) PCT Pub. No.: WO2020/165104
PCT Pub. Date: Aug. 20, 2020

(65) Prior Publication Data
US 2025/0372994 A1 Dec. 4, 2025

(51) Int. Cl.
*H02G 15/18* (2006.01)
*H02G 1/14* (2006.01)

(52) U.S. Cl.
CPC ............... *H02G 15/18* (2013.01); *H02G 1/14* (2013.01)

(58) Field of Classification Search
CPC .......... H02G 1/14; H02G 15/08; H02G 15/18; H01R 5/10; H01R 13/52
USPC ...... 174/74 R, 75 R, 84 R, 84 C, 84 S, 88 R, 174/88 C; 29/628, 629, 630; 439/59–61, 439/258
See application file for complete search history.

(56) References Cited

U.S. PATENT DOCUMENTS 2,045,361 A * 6/1936 Leonard ............... H04B 15/025 338/237
3,317,658 A * 5/1967 Smith .................... H02G 15/18 174/92
3,656,084 A * 4/1972 Malia .................. H02G 15/103 439/88
(Continued)

FOREIGN PATENT DOCUMENTS

GB 688 708 3/1953
GB 688708 A * 3/1953 ............. H01R 4/206
(Continued)

OTHER PUBLICATIONS

International Search Report dated Mar. 3, 2020.

*Primary Examiner* — William H. Mayo, III
(74) *Attorney, Agent, or Firm* — CANTOR COLBURN LLP

(57) ABSTRACT

A conductor joint for connecting a conductor end of a first cable with a conductor end of a second cable. The conductor joint has a tubular longitudinal sleeve having a sleeve opening at each longitudinal end with an inner diameter allowing insertion of the conductor ends to be connected. An elongated element is arranged within the sleeve openings. The elongated element has an electrically conductive core rod having a terminal rod wall at each longitudinal end. The first cable is electrically connected to the second cable via the electrically conductive core rod that substantially fills the space between the opposed conductor ends.

15 Claims, 11 Drawing Sheets

(56) References Cited

U.S. PATENT DOCUMENTS

| | | | | |
|---|---|---|---|---|
| 4,006,288 A * | 2/1977 | Stevens | H02G 15/184 | 24/279 |
| 4,034,151 A * | 7/1977 | Silva | H02G 15/10 | 439/586 |
| 4,050,773 A * | 9/1977 | Newell | H01R 4/5033 | 439/754 |
| 4,099,021 A * | 7/1978 | Venezia | H02G 15/18 | 439/279 |
| 5,408,047 A * | 4/1995 | Wentzel | H02G 15/103 | 174/DIG. 8 |
| 5,606,149 A * | 2/1997 | Yaworski | H02G 15/103 | 174/92 |
| 7,319,194 B2 * | 1/2008 | Bryla | H02G 15/08 | 174/92 |

FOREIGN PATENT DOCUMENTS

| | | | |
|---|---|---|---|
| GB | 1 443 578 | 7/1976 | |
| GB | 2 233 166 | 1/1991 | |
| GB | 2233166 A * | 1/1991 | H01R 4/206 |

* cited by examiner

DOUBLE-ACTING HIGH TENSION COMPRESSION JOINT

RELATED APPLICATION

This application is a National Phase of PCT/EP2020/053353 filed on Feb. 10, 2020, which claims the benefit of priority from European Patent Application No. 19 305 172.9, filed on Feb. 11, 2019, the entirety of which are incorporated by reference.

TECHNICAL FIELD

The present invention relates to a two-piece conductor joint for connecting two high voltage cables conductors and a method thereof.

BACKGROUND AND PRIOR ART

High voltage direct current (HVDC) cables and alternating current (HVAC), such as HVDC mass impregnated cables (HVDC-MI cables) and XLPE insulated cables are known and often used for long distance electrical transmission.

The conductor inside the cable is often made of copper or aluminium having a circular cross-section centre wire surrounded by concentric layers of stranded, keystone-shaped wires, resulting in a very compact conductor with a smooth surface. The keystone-shaped strands/wires are wound in a spiral, with the layers being wound in alternating directions. The first layer is e.g. wound in a clockwise spiral, the next layer is wound in a counter clockwise spiral and so on. The configuration of a central wire surrounded by such stranded wires provides the cable with improved flexibility.

The conductor can also be made of copper or aluminum compacted round wires. A number of strands of round wires are wound around each other possibly including layers of opposite directions. After the round wires have been wound together external pressure is applied to compact the wires providing a dens conductor. The centre of the cable consists of one or more stranded round wires.

The conductor of for example a HV cable can be surrounded by a plurality of insulating/protective layers. The insulation system usually consists of lapped paper tapes impregnated with a high viscosity compound (hence the term “mass impregnated”). The cable insulation can also be of extruded and cross-linked PE with semi-conductive layers around the conductor forming a conductor screen and the insulation providing an insulation screen. A moisture-proof barrier, a lead alloy sheath, is usually applied above the insulation system. For mechanical and corrosion protection, a polyethylene sheath may be applied. Cable can be of single core type or three-core type. Further, for mechanical strength, transversal reinforcement and steel or copper wire armoring may be applied. To achieve a torsion-balanced design, two layers of armor wires applied in opposite directions are often used, and the armor is corrosion protected by a protective layer. A specific example is a bitumen compound and two layers of polypropylene yarn.

HV cables are often used to traverse extremely long distances, for example 50 km. However, when the cables are not able to be manufactured and/or transported in one continuous length, therefore the cables must be joined together at a transition joint/joint section.

The cables may also be jointed in the factory, in order to achieve acquired length for delivery. Jointing in the factory will also take place when the final cable contains cable sections of different design or different cross section.

Several conductor joints are known in the art for connecting the conductors of two high-voltage (HV) cables.

US 2004/0194995 A1 (Pasini) discloses a method for joining the interfacing ends of two cables having a plurality of conductor strands. The method involves i) providing each of the cable ends with an enlarged terminal portion/enlarging member/metal inner sleeve of a greater diameter than the cable adjacent the end, ii) inserting the ends into a connecting tube/sleeve having an outer layer of explosive charge, and iii) detonating the explosive layer so as to compress the connecting tube/sleeve around the conductor strands. The terminal portions abut each other within the connecting tube to provide a joint after denotation.

The enlarging member/metal inner sleeve is provided longitudinally within the cable through the terminal portion to effect the enlargement to splay the outer strands of the cable. The resulting increased terminal extremity diameter of the cable relative to the cable adjacent the terminal portions results in the cable having a lager diameter than the rest of the conductor inside the sleeve of the connector/connecting tube. Thus, the conductors are so anchored within the sleeve/connecting tube that it cannot disadvantageously slip or be displaced.

However, this known method provides a cable joint having areas of larger diameter than the remaining cable thereby providing a cable joint having an impaired bending property which is not capable to withstand the same tensile forces as the cables themselves without the joint.

U.S. Pat. No. 3,320,659 (Jerome) discloses a method for connecting two cable ends by arranging the cable ends in an abutting or overlapping alignment inside a metal conductor sleeve followed by compressing the sleeve onto the cables by circumferential compression. The cable ends are thereby spliced together with little or no elongation of the cables. The sleeve has a regular smooth barrel shape avoiding corners and sharp edges and may have a roughened inner surface for better gripping the cable ends during compression. The resulting splice has a larger cross-sectional diameter than the conductor’s cross-sectional diameter.

GB688708 discloses a coupling for stranded electrical conductors, with a rigid insertion piece and a ductile sleeve. After compression of the ductile sleeve the conductors at the joint have variating radial cross sections.

GB1443578 discloses a method of joining two conductors of electrical cables with a central duct for the passage of oil. A compression resistant tube is connecting the central ducts of the conductor ends and a compressible clamping sleeve is compressed onto the connected conductor ends.

It is thus an object of the present invention to provide a conductor joint that does not reduce the bending properties of the cables/conductors to be connected.

It is a further object of the invention to provide a conductor joint that can withstand the same tensile forces as the cables/conductors to be connected.

It is a further object of the invention to provide a conductor joint having similar or same cross-sectional diameter as the cross-sectional diameter of the two conductors to be connected.

It is a further object of the invention to provide a conductor joint having a short longitudinal length.

It is a further object of the invention to provide a method for installing a conductor in a time efficient and simple manner.

SUMMARY OF THE INVENTION

The present invention is set forth and characterized in the independent claims, while the dependent claims describe other characteristics of the invention.

The invention provides a conductor joint for connecting conductors of two HV cables. Examples of HV cables include HVDC-MI cables as disclosed in EP 3416253 A1, incorporated herein by reference and HVAC XLPE cables.

The joint comprises two separate parts; an open-ended outer tubular sleeve and an elongated core element arranged within a sleeve opening, which together join the conductor ends of the two HV cables under pressure such as circular hydraulic pressure. The conductors of the HV cables to be joined comprise a circular center wire or group of center wires surrounded by concentric layers of stranded wires, wherein the wires may be keystone-shaped or compacted.

Before joining the two HV cable conductors, any protective layers and insulating layers are removed from the end portion/terminal portion of each cable, thereby exposing the conductors.

More specifically the invention concerns a conductor joint for connecting a conductor end of a first cable with a conductor end of a second cable. The conductor joint comprises a tubular longitudinal sleeve of a sleeve length Ls having a sleeve opening at each longitudinal end and an elongated element arranged within the sleeve openings, preferably concentrically within the sleeve.

That the joint comprises a combination of a sleeve and an elongated element therein forms a double acting conductor joint which is configured such that, during connection of the conductor ends, compression of the sleeve causes the layers of stranded wires to be squeezed between the outer sleeve and the inner elongated element. Thus, when the external compression is performed directly on the sleeve by for example a hydraulic press, an internal compression of the joint is performed indirectly by the elongated element.

The resulting joint will have the same, or almost the same, outer diameter as the conductors of the first and second cable. Hence the sleeve, the elongated element and the layers of stranded wires are lengthened in the longitudinal direction during compression.

The inner diameter of the sleeve has a size and shape that allows insertion of the conductor ends of the first and second cable.

A person skilled in the art will appreciate that when joining conductors of cables with more than one phase the joint according to the present invention can be applied on every conductor phase, but preferably at different longitudinal positions to spread the influence of the joints on the overall cable.

In a preferred embodiment, the core rod length Lr is longer than the sleeve length Ls.

Further, the sleeve may have an inner surface shaped as two tubular stairs mirrored around a radial cross-sectional area at a longitudinal center of the sleeve. The two tubular stairs may have identical steps for joining identical conductor ends or the tubular stairs may have different step shapes for joining conductors with different dimensions and/or configuration. Optionally the number of steps may also be adapted to the conductor dimension and/or configuration and/or number of layers of strands.

Each stair may comprise

- a lower step surface at the nearest sleeve opening oriented along a longitudinal axis of the sleeve,
- a higher step surface oriented along the longitudinal axis of the sleeve at or near the longitudinal center and
- a step wall arranged between the lower step surface and the higher step surface oriented along the radial cross-sectional direction of the sleeve.

The elongated element may comprise a core rod having a core rod length Lr and a terminal rod wall at each longitudinal end and is preferably arranged longitudinally centered within the sleeve.

The conductor of both the first and the second cable that is to be interconnected May comprise a circular center wire or group of center wires surrounded by a plurality of concentrically layers of stranded wires. With an arrangement comprising a circular center wire, said wire would be the innermost wire of the conductor. With an arrangement comprising a group of center wires, the group would be arranged in the center of the conductor.

In an embodiment, the lower and higher step-surfaces of the inner surface of the sleeve form a step-shaped inner surface of the sleeve. After compression, the inner longitudinal step-shaped surface of the sleeve, the longitudinal outer surface of the layers of stranded wires and the outer longitudinal surface of the elongated element is altered into a wave-shape/S-form or partial wave-shape/S-form in the longitudinal direction, thereby forming a locked configuration/locking mechanism/ward between the layers of stranded wires of the conductor ends of the first and second cables and the conductor joint.

The compressed joint has a high mechanical and tensile strength, a strength that preferably corresponds to the mechanical tensile strength of the conductors of the cables. Further, the joint has a bending diameter that corresponds to the bending diameter of the conductor of the cables.

Before connecting the conductor ends of the first and second cable, a longitudinal portion of the circular center wire or group of center wires is removed from the conductor ends, thereby creating a recess surrounded by the layers of stranded wires. During insertion of the conductor ends into the sleeve, the core rod is inserted into the recess of each conductor end.

In a preferred embodiment the core rod comprises a core rod length Lr that is longer than the sleeve length Ls such that the core rod extends outside the sleeves inner surface during connection. As a result, the circular center wire or group of center wires of the conductors is not inserted inside the sleeve and therefore not radially compressed by the outer sleeve during compression. The resulting joint comprises an improved mechanical strength and tensile force.

The outer surface of the sleeve may have an inclination angle at each end towards the central longitudinal axis. The inclination angle may be from 5 to 80° relative to the central longitudinal axis, more preferably from 20 to 50°, e.g. 30°.

The elongated element may further comprise

- a core tube concentrically arranged around the core rod, for example longitudinally centered, having a core tube length Lt shorter than the core rod length Lr and wherein the diameter of the core tube is larger than the diameter of the core rod, and
- a core wall/core step wall arranged between the core rod and the core tube oriented along a radial cross-sectional area of the elongated element
- optionally, a step on the outer surface of the core tube to correspond to an additional step in one of the stairs of the sleeve.

The core rod and the core tube may be one elongated element. The material for the elongated element is adapted to the materials of the conductors to be jointed, and if conductors of different material such as copper and aluminum are to be jointed the elongated element may comprise a copper part and an aluminum part welded together to form one elongated element with a copper end and an aluminum end.

The core wall/core step wall configuration is preferred when the conductor to be connected comprise more than two layers of stranded wires.

In one embodiment where the sleeve comprises a step wall arranged at a lower step surface end, distal to the nearest sleeve opening, each stair may further comprise an intermediate step surface and an intermediate step wall arranged between the step wall and the higher step surface.

Depending on the number of outer layers of stranded wires on the conductors to be connected, more steps can be arranged inside the inner sleeve and/or on the elongated element.

To make a joint that has the same tensile strength and bending diameter as the conductors to be connected the sleeve length Ls should be the same or longer than the diameter of at least one of the conductors of the cables to be connected. For example, the sleeve length may be at least 50% longer than the diameter of one of the conductor ends to be connected, preferably at least 100% longer, for example 105% longer. Further, it is preferred that the sleeve is not longer than 400% of the diameter of the conductor.

The core rod length Lr may be at least 5% longer than the sleeve length Ls to ensure that the circular center wires of the conductors are not inserted inside the sleeve. The core rod length may for example be 15% longer than the sleeve length Ls. However, the core rod length Lr is preferably not more than 100% longer than the sleeve length Ls.

The radial distance/thickness of the core wall may be equal or near equal to a radial distance/thickness of a layer of a stranded wire arranged immediately adjacent to a center wire of the conductor ends to be connected.

As already mentioned, a longitudinal portion of the circular center wire or group of center wires of the conductor ends of the first and second cable is removed creating a recess surrounded by the layers of stranded wires before inserting the conductor ends into the sleeve. During insertion of the conductor ends into the sleeve, the core rod is inserted into the recess of each cable end, thus the diameter of the core rod should be smaller or correspond to the diameter the recess/diameter of the circular center wire of the conductors to be connected. If the outer diameters of the conductors, or the diameter of the center wire or group of center wires are different, there may be differences in diameter of sleeve steps and/or the core rod at the respective ends.

Further, to provide a stronger locking mechanism within the joint after compression, a longitudinal length of the terminal rod wall at at least one longitudinal end may have a larger diameter than the remaining longitudinal length of the core rod, thereby creating a step. The diameter of the terminal rod wall is smaller or equal to the diameter of the recess. Such step may at contribute to a stronger locking mechanism of the joint.

In a preferred embodiment the dimeter of the terminal rod wall is less than 5% larger than the dimeter of the remaining part of the core rod, preferably less than 3% larger, for example 2.6% larger.

The lengths of each step surface along a longitudinal axis of the sleeve may be equal or near equal for each stair.

After compression it is important that the joint has good conductive properties, preferably the same conducting properties as the conductors to be connected. To ensure that the conductive properties are not reduced when compared to the conducting properties of the conductors to be connected, the contacting surface between the radially adjoining surfaces inside the sleeve should have a high degree of friction/abutting surfaces. The radial distance of each step wall of the sleeve may thus equal or near equal to the corresponding radial thickness of a layer of a stranded wire. The radial direction is in this context facing perpendicular to the longitudinal axis of the sleeve. Further, the step surface of each step surface of each stair may have a length along the longitudinal axis of the sleeve which is at least twice the radial thickness/height/distance of the step wall. Further, more than 50% of the outer surface of the elongated element may be threaded and/or more than 50% of the inner surface of the sleeve is threaded for achieving a high degree of friction between the radially adjoining surfaces.

The crossing/corner between a step surface and a step wall can be curved having corners being rounded by an arc of a circle, and wherein the radius of the circle is in the range from 5 mm to 80 mm, preferably between 10 mm and 70 mm, more preferably between 15 mm and 60 mm, for example 25 mm.

The present invention further discloses a method for connecting the conductor end of the first cable with the conductor end of the second cable using a conductor joint.

The conductor ends of the first and second cable comprise
- a circular center wire comprising a terminal wall or a group of center wires comprising a terminal wall,
- a plurality of concentrically layers of stranded wires surrounding the circular center wire wherein each layer of stranded wires comprising a terminal wall.

The conductor joint comprises any one of the above-mentioned embodiments which include
- a tubular longitudinal sleeve of a sleeve length Ls having a sleeve opening at each longitudinal end with an inner diameter allowing insertion of the conductor ends to be connected, and
- an elongated element arranged within the sleeve openings, wherein the elongated element comprises
  - a core rod having a core rod length Lr and a terminal rod wall at each longitudinal end.

The method comprises the following steps:

i) inserting the conductor end of the first cable into one sleeve opening such that
   one of the two terminal rod wall abuts or is adjacent to the terminal wall of the circular central wire of the first cable or such that one of the two terminal rod walls abut or is adjacent to the terminal wall of the group of center wires of the first cable and ii) inserting the conductor end of the second cable inside the other sleeve opening such that
   the other terminal rod wall abuts or is adjacent to the terminal wall of the circular central wire of the second cable, or such that the other terminal rod wall abuts or is adjacent to the terminal wall of the group of center wires of the second cable; and iii) compressing said sleeve radially towards the elongated element, thereby locking the conductor joint to the conductor ends.

Before inserting the conductor ends of the first and second cable into the sleeve the conductor ends can be prepared using for example a milling tool, drill and/or any other kind of equipment such that a longitudinal part of the center wire is removed creating a recess surrounded by the innermost layer of stranded wires.

Further, if the sleeve is step-shaped, the layers of stranded wires may be prepared into stepped layers so that they may abut or be arranged adjacent to another layer of stranded wires or abut or be arranged adjacent to a corresponding step wall of the sleeve.

During insertion of the cable ends into the sleeve, the core rod of the elongated element can be inserted the recess of the conductor ends of the first and second cable such that the terminal rod wall abuts or is adjacent the terminal wall of the circular center wire.

In the embodiment where the elongated element comprises the core tube arranged around the core rod, the conductor ends can be further prepared for the innermost layer of stranded wires to abut or be adjacent to the core wall.

Further, the terminal wall of a third layer of stranded wires of the conductor end of the first cable may abut or be adjacent to a terminal wall of a third layer of stranded wires of the conductor end of the second cable.

Step iii) may further involve circularly compressing the sleeve until the diameter of a jointed section is the same or similar to the diameter of the conductor ends of the first and second cable.

The first and second cable may have the same configuration and dimensions, or the first and second cable may have different configuration and/or dimensions. Different dimensions include different conductor cross sections and/or different dimensions of the conductor strands within the same overall conductor dimension. Different configurations refer to different conductor designs such as compacted round wires, one or more layers of keystone-shaped wires surrounding a central wire, segmented conductor often referred to as Milliken conductor.

Both the circular center wire and the stranded wires of the conductor can be made of a metal, such as copper or aluminum. The conductor joint parts are in one aspect made of the same metal as the conducting wires of the cable. In another aspect the sleeve and the elongated element are made of metals different from one or both of the conductors to be jointed. Accordingly, the selection of the metal such as copper or aluminum for the sleeve, the elongated element, the first and the second conductor can be freely selected depending on the requirements to the cable and it should be understood that all combinations are considered available options within the scope of the present invention. The conductors of the two HV cables to be connected have in one embodiment the same or close to the same cross-sectional diameter. In another embodiment the conductors to be jointed are different, such that one conductor has a different cross-sectional diameter, and/or strand configuration and/or material than the other conductor.

Within the context of the application, the term "conductor" refers to the electricity conducting element comprising a center wire and the total number stranded wires surrounding the center wire or a group of center wires and the stranded wires surrounding the group of center wires.

The term "conductor end" refers to an end-section of the conductors of the cables which is inserted into the sleeve of the conductor joint before compression, wherein any outer insulating layers and/or protective layers have been removed.

The term "stranded wires" refers to smaller wire-shaped elements that are stranded/twisted together to form a conductor. In one embodiment the stranded wires have a key-shaped cross-section. In another embodiment the stranded wires have a round cross section.

The term "keystone-shaped" means that the cross-section of each wire/strand has a key shaped form which can be of any form which allows each strand to lock itself to the adjacent strand such that a tight configuration between the strands is achieved. Such key-shaped strands and HV cables comprising such key-shaped strands are known in the art.

The term "round wires" refer to a conductor consisting of multiple round wires packed closely and optionally also compacted.

The term "radial" may not only refer to a direction perpendicular to the axial longitudinal direction but may also refer to a direction having an inclined angle and/or wherein the radial component is more than 50% if not stated otherwise.

The term "wall" refers to a radial wall which can have different radial shapes such as straight, curved or arrow-shaped and is merely used to describe the terminal ends where the components abut or are arranged adjacent to each other before compression. Thus, the term should not be interpreted as a limiting feature. Further, the step wall does not have to be straight but may be uneven having recesses and/or being bulky.

The term "circular hydraulic pressure" refers to a hydraulic press exerting circular pressure onto the sleeve by a circular shaped die, thereby forming a circular shaped conductor joint causing some elongation of the conductor joint and conductors of the first and second cable during compression.

In the following description, numerous specific details are introduced to provide a thorough understanding of embodiments of the claimed joint and method. One skilled in the relevant art, however, will recognize that these embodiments can be practiced without one or more of the specific details.

BRIEF DESCRIPTION OF THE DRAWINGS

FIG. 8A also shows a longer part of the first and second cable.

In the drawings, like reference numerals have been used to indicate like parts, elements or features unless otherwise explicitly stated or implicitly understood from the context. For similar elements of different embodiments: reference numerals with an added hundred digit.

DETAILED DESCRIPTION OF THE INVENTION

The invention will now be described with reference to a specific example of joining the conductors ends of two HV cables. It should be understood however that the invention is suitable for joining other types for conductors as long as the conductor is of the type having a circular center wire or group of center wires surrounded by stranded wires. It should also be understood that the different embodiments of the sleeve and elongated element may be combined and adapted to fit different conductors.

Figure 1:
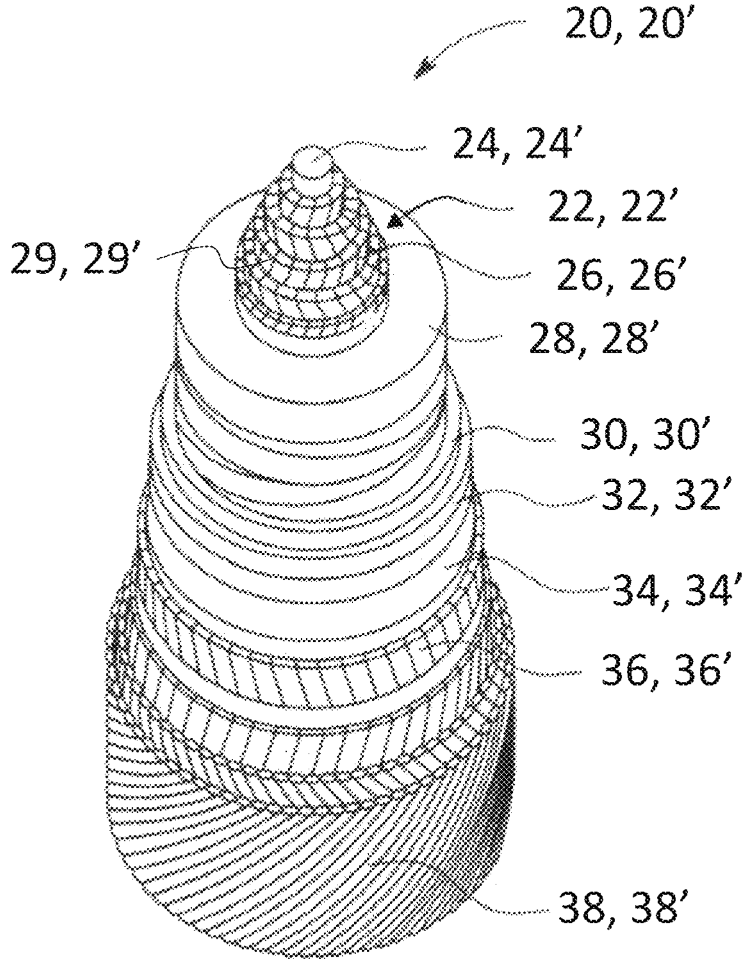
Fig. 1 (prior art)
FIG. 1 is a perspective view of a first or second HVDC-MI cable known from prior art.

FIG. 1 shows a first and second HVDC-MI cable 20, 20' known from prior art. Each cable 20, 20' comprises a conductor 22, 22' having a circular central wire 24, 24' surrounded by layers 26, 26' of stranded wires 29, 29' providing flexibility of the cables 20, 20'. Surrounding the conductor 22, 22' are a plurality of insulating and/or protective layers. Immediately adjacent conductor 22, 22' is an insulation layer 28, 28' which can be a mass-impregnated paper insulation known in the art, comprising a plurality of wrapped layers of oil-impregnated paper or an XLPE insulation system. Outside the insulation layer 28, 28' is a water tight lead barrier/layer 30, 30'. About the lead layer 30, 30' is arranged a polyethylene layer 32, 32'. A strengthening layer 34, 34' of galvanized steel is arranged about the polyethylene layer 32, 32'. An armor layer 36, 36' comprising galvanized steel bands protects the cable from abrasion and other forces. Finally, the cables 20, 20' comprise an outer protective layer 38, 38' bitumen polypropylene yarn.

Figure 2A:
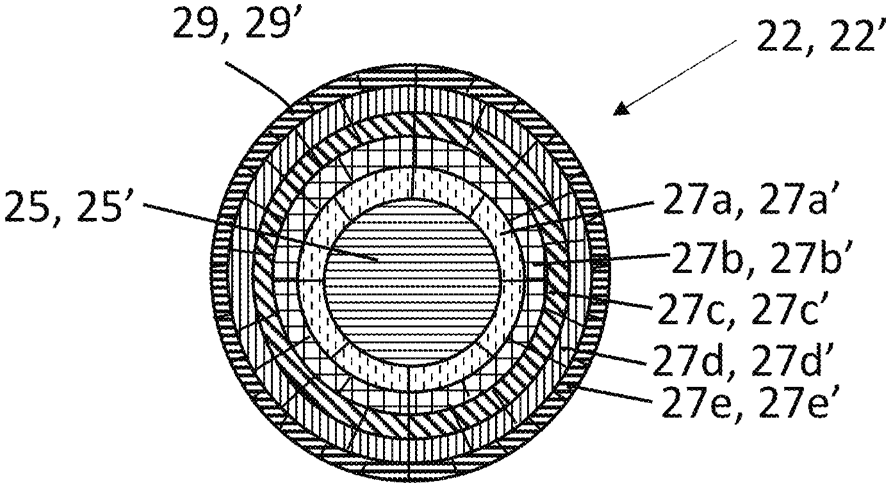
FIG. 2A (prior art)
FIG. 2A is a cross-sectional view of the conductor in the HVDC-MI cable shown in FIG. 1.
Figure 2B:
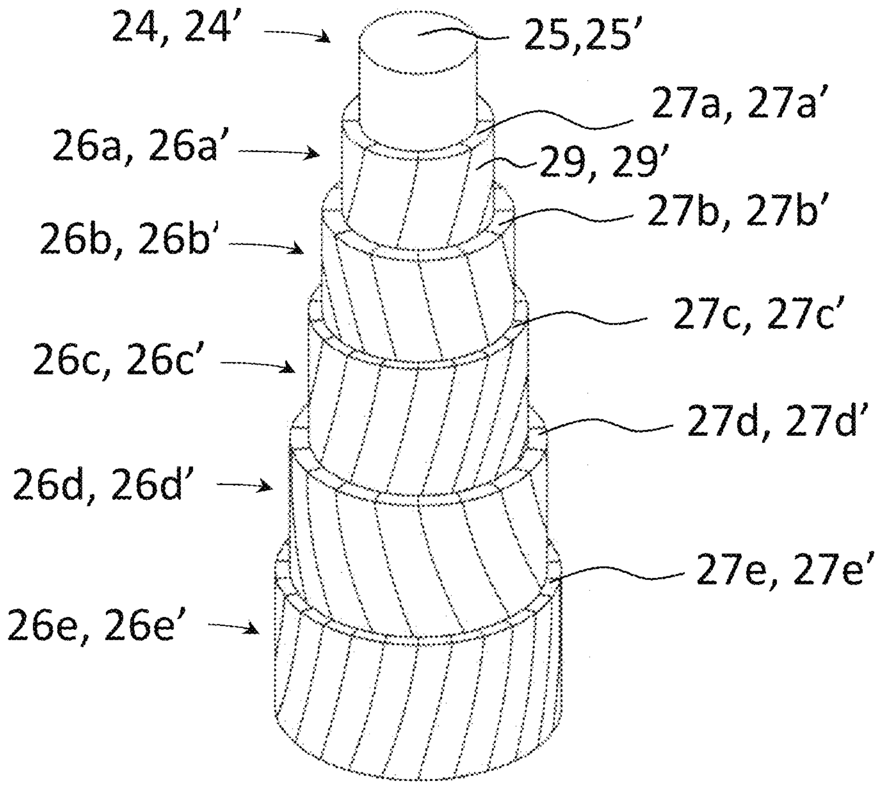
FIG. 2B (prior art)
FIG. 2B is a perspective view of the conductor shown in FIG. 1 and FIG. 2A.

As shown in FIGS. 2A and 2B, the central wire 24, 24' is a round/circular wire, and the stranded wires 29, 29' are keystone-shaped to be tightly packed about the central wire 24, 24'. In the examples used herein the first and second cable 20, 20' have five layers 26*a-e*, 26*a*'-e' of stranded wires 29, 29'. The stranded wires 29, 29' are wrapped in a spiral about the central wire 24, 24', with alternating layers being wrapped in alternating directions as shown in FIG. 2B. Each layer 26*a-e*, 26*a*'-e' of stranded wires 29, 29' has a terminal wall 27*a-e*, 27*a*'-e'. Further, the circular center wire 24, 24' has a terminal wall 25, 25'.

Figure 3:
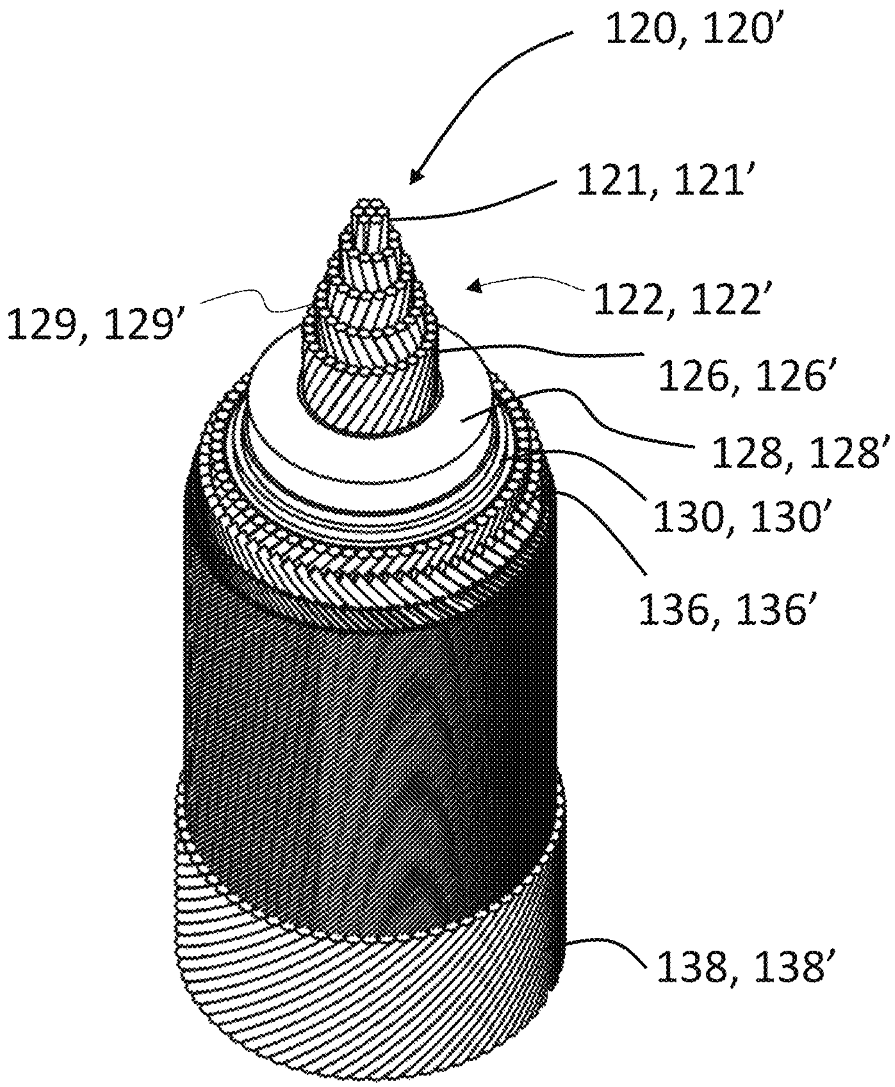
Fig. 3 (prior art)
FIG. 3 is a perspective view of a first or second HV-XLPE cable known from prior art.
Figure 4A:
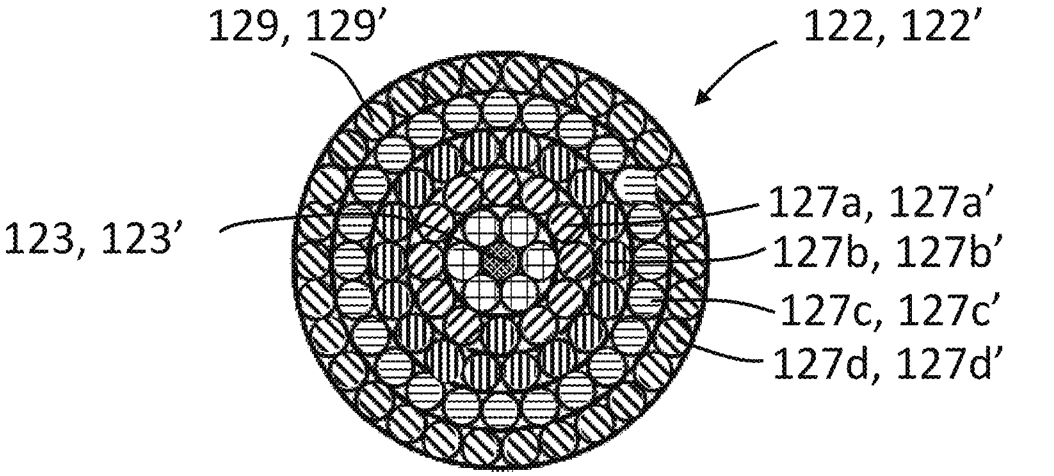
FIG. 4A (prior art)
FIG. 4A is a cross-sectional view of the conductor in the HV-XLPE cable shown in FIG. 3.
Figure 4B:
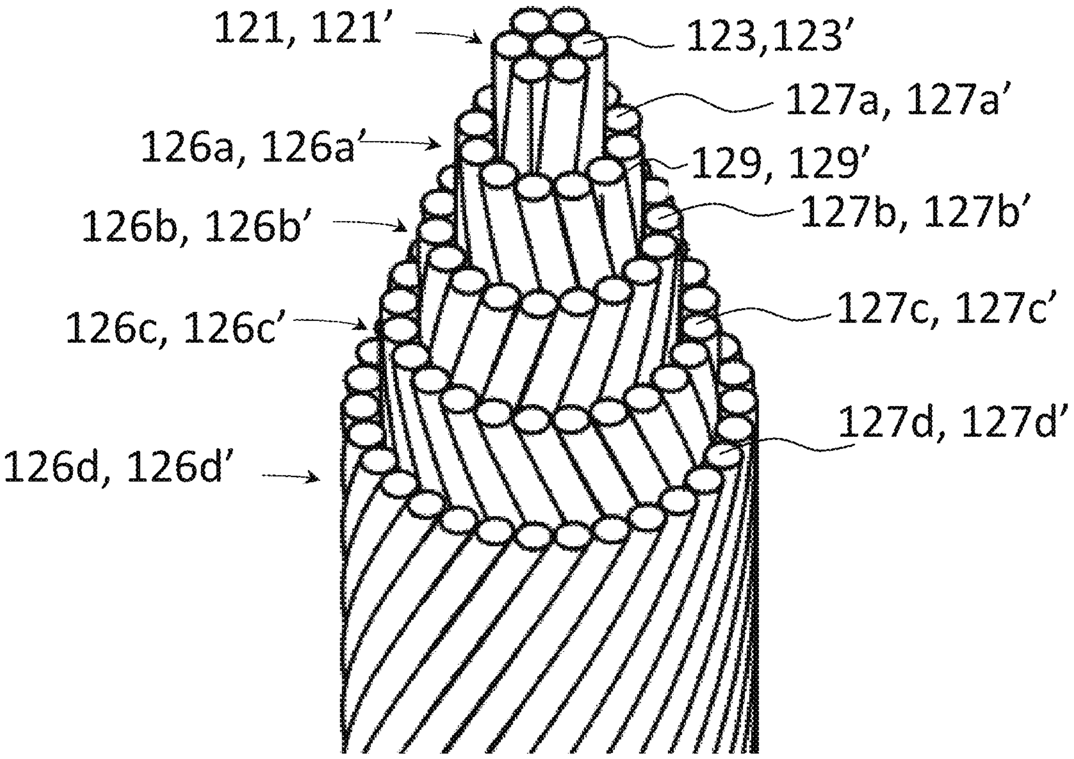
FIG. 4B (prior art)
FIG. 4B is a perspective view of the conductor shown in FIG. 4A.

FIGS. 3, 4*a* and 4*b* show respectively a HV cable with round wire conductor, the cross section and perspective view of the round wire conductor.

FIG. 3 shows a first and second HV cable 120, 120' known from prior art. Each cable 120, 120' comprises a conductor 122, 122' having a group of center wires 121, 121' surrounded by layers 126, 126' of stranded wires 129, 129' providing flexibility of the cables 120, 120'. Surrounding the conductor 122, 122' are a plurality of insulating and/or protective layers. Surrounding the conductor 122, 122' is an insulation layer 128, 128' which can be a mass-impregnated paper insulation known in the art, comprising a plurality of wrapped layers of oil-impregnated paper or a XLPE insulation system. Outside the insulation layer 128, 128' is a water tight lead barrier/layer 130, 130'. An armor layer 136, 136' comprising galvanized steel wires protects the cable from abrasion and other forces. Finally, the cables 120, 120' comprise an outer protective layer 138, 138'.

A person skilled in the art will appreciate that the cables shown in FIGS. 1 and 3 are only examples of HV cable designs and that the selection of insulation, field distribution layers, protection layers and armoring can be adapted to the requirements to the cables independently of the conductor joint according to the present invention.

As shown in FIGS. 4A and 4B, the group of center wires 121, 121' is a group of round/circular wires, and the stranded wires 129, 129' are also round wires packed about the group of center wires 121, 121'. In the examples used herein the first and second cable 120, 120' have four layers 126*a-d*, 126*a*'-d' of stranded wires 129, 129'. The stranded wires 129, 129' are wrapped in a spiral around the group of center wires 121, 121', with alternating layers being wrapped in alternating directions as shown in FIG. 4B. Each layer 126*a-d*, 26*a*'-d' of stranded wires 129, 129' has a terminal wall 127*a-d*, 127*a*'-d'. Further, the group of center wire 121, 121' has a terminal wall 123, 123'.

Figure 5A:
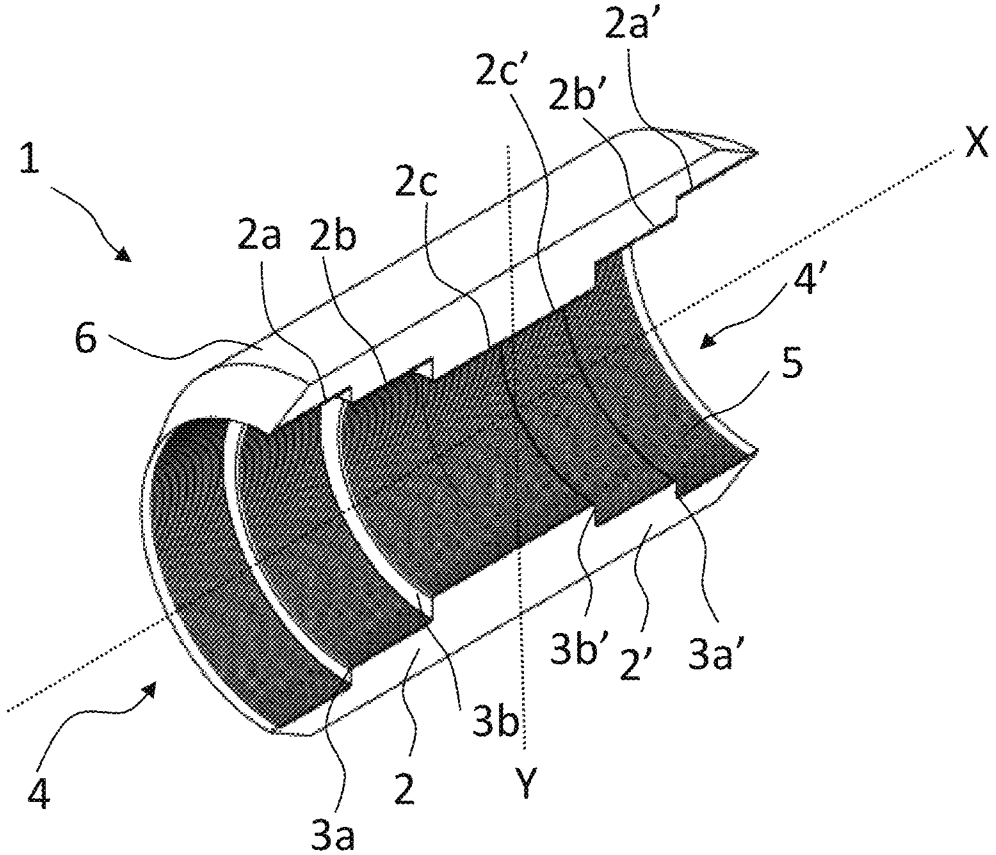
FIG. 5A is an open perspective view of the sleeve of the conductor joint.

FIG. 5A shows an open view the tubular longitudinal sleeve 1 of the conductor joint showing a part of the inner and outer surface 5, 6 of the sleeve 1. The inner surface 5 of the sleeve 1 is shaped as two tubular stairs, referred to as a first and a second tubular stair 22, 22', which are mirrored around the radial cross-sectional area Y at the longitudinal center of the sleeve 1. The longitudinal center of the sleeve being arranged where the X-axes and Y-axes in FIG. 5A meet.

The inner diameter of the sleeve 1 is decreasing towards the longitudinal center of the sleeve 1, being at the largest at the sleeve openings 4, 4'. Each tubular stair 2, 2' has a lower step surface 2*a*, 2*a*' arranged nearest the corresponding sleeve opening 4, 4'. As shown, the lower step surface 2*a* of the first stair 2 is arranged nearest sleeve opening 4, and the lower step surface 2*a*' of the second stair 2' is arranged nearest sleeve opening 4'. Further, each stair 2, 2' has a higher step surface 2*c*, 2*c*' and an intermediate step surface 2*b*, 2*b*'. The higher step surface 2*c* of the first stair 2 is flush with higher step surface 2*c*' of the second stair 2'. The intermediate step surface 2*b* of the first stair 2 is arranged between the lower step surface 2*a* and the higher step surface 2*c*, while the intermediate step surface 2*b*' of the second stair is arranged between the lower step surface 2*a*' and the higher step surface 2*c'*.

In the first stair 2, arranged between the lower step surface 2*a* and the intermediate step surface 2*b*, is a first step wall 3*a* oriented parallel to the radial cross-sectional direction/radial axis Y of the sleeve 1.

Further, the crossing/corner between the lower step surface 2*a* and the first step wall 3*a* is curved and the crossing/corner between the first step wall 3*a* and the intermediate step surface 2*b* is curved.

Between the intermediate step surface 2*b* and the higher step surface 2*c*, is arranged a second step wall 3*b* oriented parallel to the radial cross-sectional direction of the sleeve 1.

The crossing/corner between the intermediate step surface 2*b* and the second step wall 3*b* is curved and the crossing/corner between the second step wall 3*b* and the higher step surface 2*c* is curved.

It is also shown that the step surfaces 2*a*, 2*b*, 2*c* have equal longitudinal lengths arranged parallel to the longitudinal axis X of the sleeve.

Also, the first and second step wall 3*a*, 3*b* have the same radial distance/thickness.

Since the first and second stair 2, 2' are mirrored, it is implicit that the second stair 2' has the same, but mirrored configuration and will not be described in further detail.

Figure 5B:
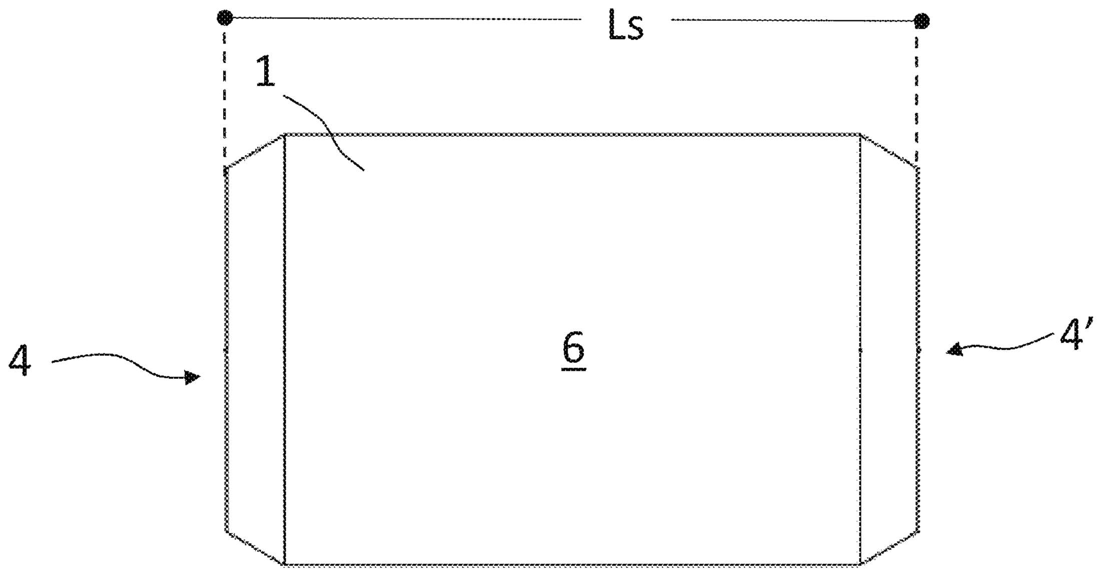
FIG. 5B is a perspective view of the sleeve of the conductor joint.

The outer surface 6 of the sleeve is shown in FIG. 5B and is substantially tubular. The outer surface 6 of the sleeve 1 is parallel to the longitudinal axis X of the sleeve 1 and is having an inclination angle at each end towards the central longitudinal axis X of the sleeve. The shown inclination angle is 30°. Further, about 85% of the outer surface 6 of the sleeve 1 is shown being parallel with the longitudinal axis X of the sleeve 1.

Figure 6A:
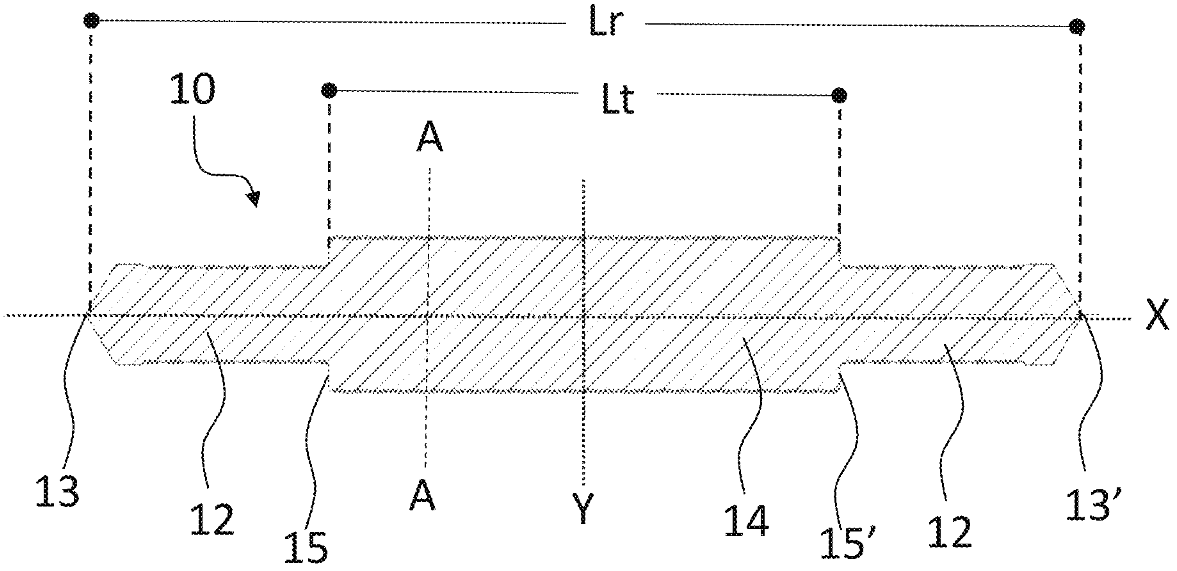
FIG. 6A is a two-dimensional view of the elongated element of the conductor joint.
Figure 6B:
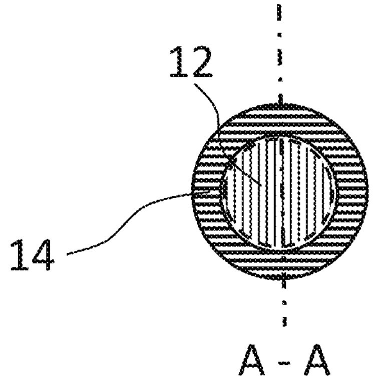
FIG. 6B is a cross sectional view along A-A of FIG. 6A.
Figure 6C:
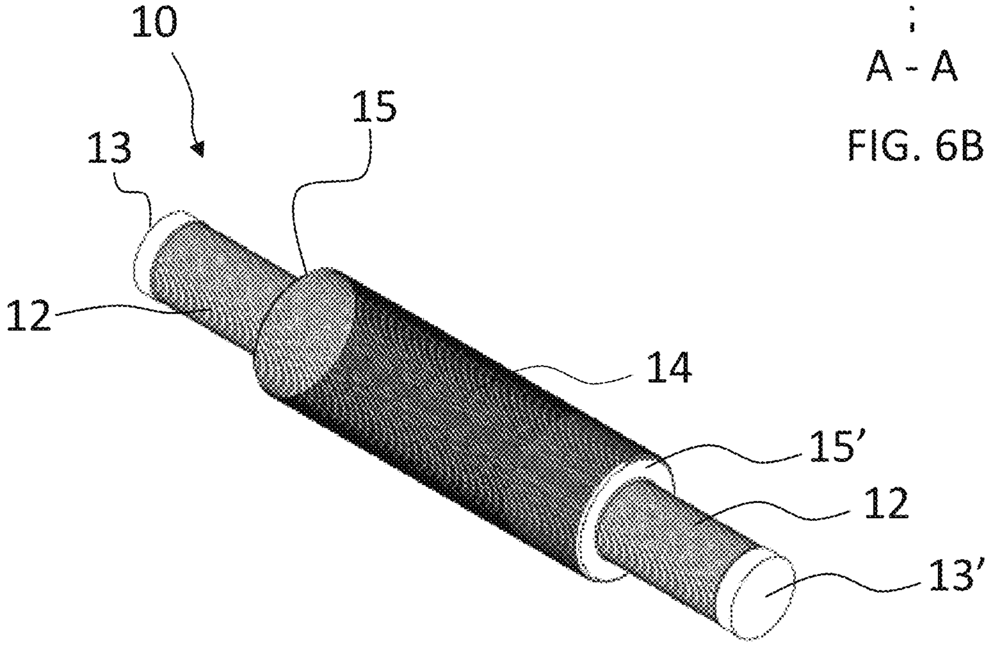
FIG. 6C is a perspective view of the elongated element of the conductor joint

FIGS. 6A and 6C illustrate the elongated element 10 of the conductor joint having a core tube 14 arranged around the core rod 12. The core tube 14 and the core rod 12 are concentric and the core tube 14 is longitudinally centered to the core rod 12. A first and second core wall 15, 15' is arranged at each longitudinal end of the core tube 14 between the core rod 12 and the core tube 14. Each core wall 15, 15' is oriented parallel to the radial cross-section direction of the elongated element 10.

The core walls 15, 15' create a step from the outer surface of the core rod 12 to the outer surface of the core tube 14.

The crossing/corner between the outer surface of the core rod 12 and the first and/or second core wall 15, 15' is curved and the crossing/corner between the outer surface of the core tube 14 and the first and/or second core wall 15, 15' is curved.

Further the illustration of the elongated element shows that the outer surface of the core rod 12 and core tube 14 are threaded.

It is also shown that the core element 12 has a first terminal wall 13 the one longitudinal end, and a second terminal wall 13' at the other terminal end.

In FIG. 6A the terminal walls 13, 13' have an arrow shape and a longitudinal part having a larger diameter than the remaining longitudinal length of the core rod 12 creating a step near the longitudinal ends of the core rod 12.

In FIG. 6C a longitudinal length of the terminal walls 13, 13' also have a larger diameter than the remaining longitudinal length of the core rod 12 thereby creating a step near the longitudinal ends of the core rod 12. Such step may contribute to a stronger locking mechanism of the joint. Further, the terminal walls 13, 13' are radially oriented.

FIG. 6B shows a cross sectional view along A-A in FIG. 6A which illustrate that the diameter of the core tube 14 is greater than the diameter of the core rod 12.

Figure 7:
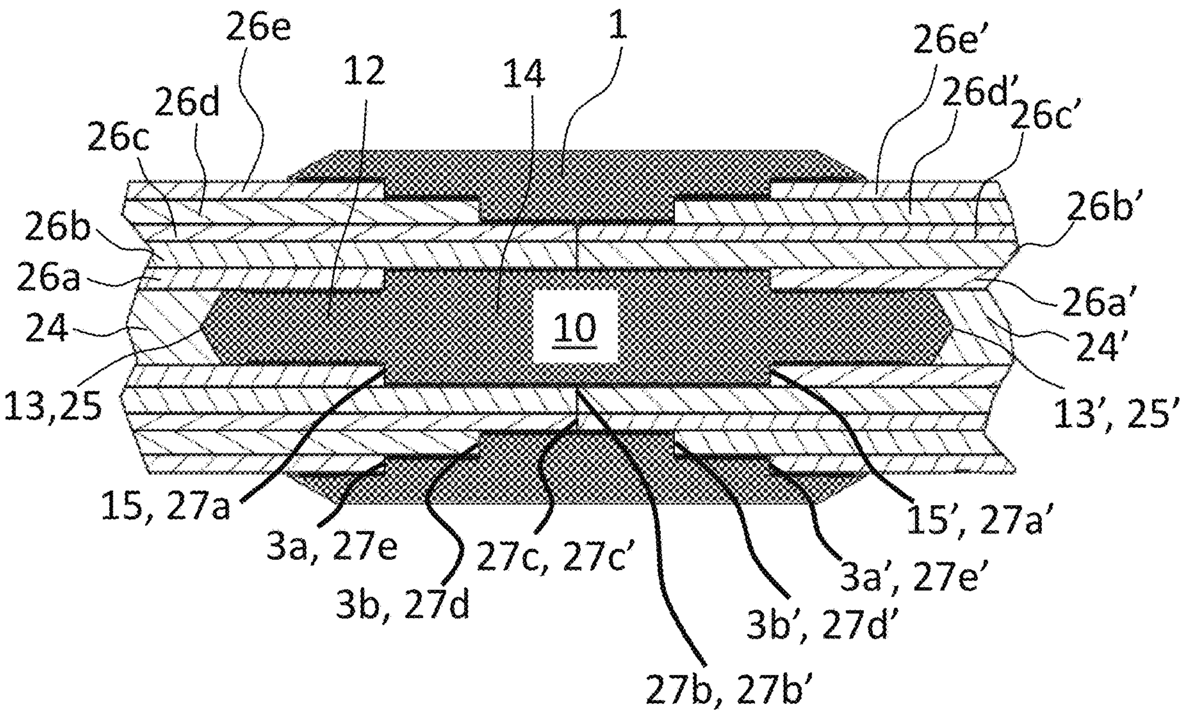
FIG. 7 is a close-up view of the connection between the conductor joint and the conductor ends of the first and second cable.

FIG. 7 shows the connection between the conductor joint and the conductor ends of the first and second cable after inserting the conductor ends into the sleeve 1.

The inner surface of the sleeve 1 of the conductor joint has the same configuration as shown in FIG. 5A and the elongated element 10 has the same configuration as shown in FIG. 6A.

The first cable comprises the circular center wire 24 being the innermost wire of the cable. The center wire 24 has a terminal wall 25 which is shown to have a corresponding shape to the arrow-shaped first terminal wall 13 of the core rod 12 of the elongated element 10 and the radial face of the terminal wall 25 of the center wire 24 is abutting the radial phase of the first terminal wall 13 of the core rod 12.

A first layer 26*a* of stranded wires of the first cable is immediately surrounding the circular center wire 24. The first layer 26*a* of stranded wires is therefore the innermost layer of stranded wires. The first layer 26*a* of stranded wires has a terminal wall 27*a* which abuts the first core wall 15 of the elongated element 10.

The second cable comprises the circular center wire 24' being the innermost wire of the second cable. The center wire 24' has a terminal wall 25' which is shown to have a corresponding shape to the arrow-shaped second terminal wall 13' of the core rod 12 of the elongated element 10 and the radial face of the terminal wall 25' of the center wire 24' is abutting the radial phase of the second terminal wall 13' of the core rod 12.

A first layer 26*a'* of stranded wires of the second cable is immediately surrounding the circular center wire 24'. The first layer 26*a'* of stranded wires is therefore the innermost layer of stranded wires. The first layer 26*a'* of stranded wires has a terminal wall 27*a'* which abuts the second core wall 15' of the elongated element 10.

A second layer 26*b* of stranded wires of the first cable is immediately surrounding the first layer 26*a* of stranded wires, and a second layer 26*b'* of stranded wires of the second cable is immediately surrounding the first layer 26*a'* of stranded wires. The second layer 26*b* has a terminal wall 27*b* which abuts a terminal wall 27*b'* of the second layer 26*b'* of stranded wires of the second cable.

A third layer 26*c* of stranded wires of the first cable is immediately surrounding the second layer 26*b* of stranded wires, and a third layer 26*c'* of stranded wires of the second cable is immediately surrounding the second layer 26*b'* of stranded wires. The third layer 26*c* has a terminal wall 27*c* which abuts a terminal wall 27*c'* of the third layer 26*c'* of stranded wires of the second cable.

A fourth layer 26*d* of stranded wires of the first cable is immediately surrounding the third layer 26*c* of stranded wires. The fourth layer 26*d* is further having a terminal wall 27*d* abutting the second step wall 3*b* of first stair of the sleeve 1.

A fourth layer 26*d'* of stranded wires of the second cable is immediately surrounding the third layer 26*c'* of stranded wires. The fourth layer 26*d'* is further having a terminal wall 27*d'* abutting the second step wall 3*b'* of second stair of the sleeve 1.

A fifth layer 26*e* of stranded wires of the first cable is immediately surrounding the fourth layer 26*d* of stranded wires. The fifth layer 26*e*, which is the outermost layer of stranded wires of the first cable, is further having a terminal wall 27*e* abutting the first step wall 3*a* of the first stair of the sleeve 1.

A fifth layer 26*e'* of stranded wires of the second cable is immediately surrounding the fourth layer 26*d'* of stranded wires. The fifth layer 26*e'*, which is the outermost layer of stranded wires of the second cable, is further having a terminal wall 27*e'* abutting the first step wall 3*a'* of the second stair of the sleeve 1.

Figure 8A:
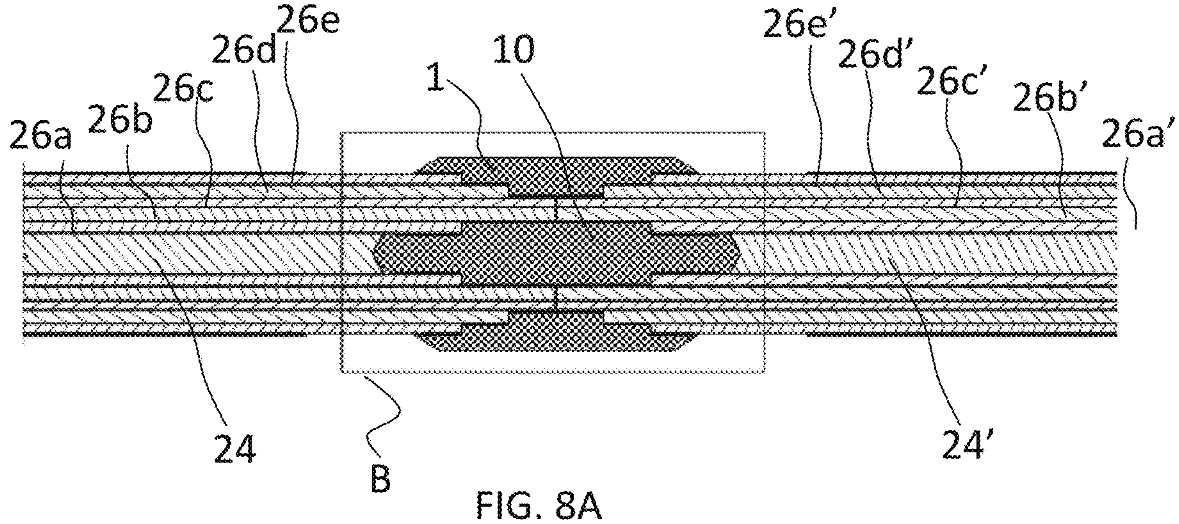
FIG. 8A is a view of the connection between the conductor joint and the conductor ends of the first and second cable shown in FIG. 7 before compressing the conductor joint.
Figure 8B:
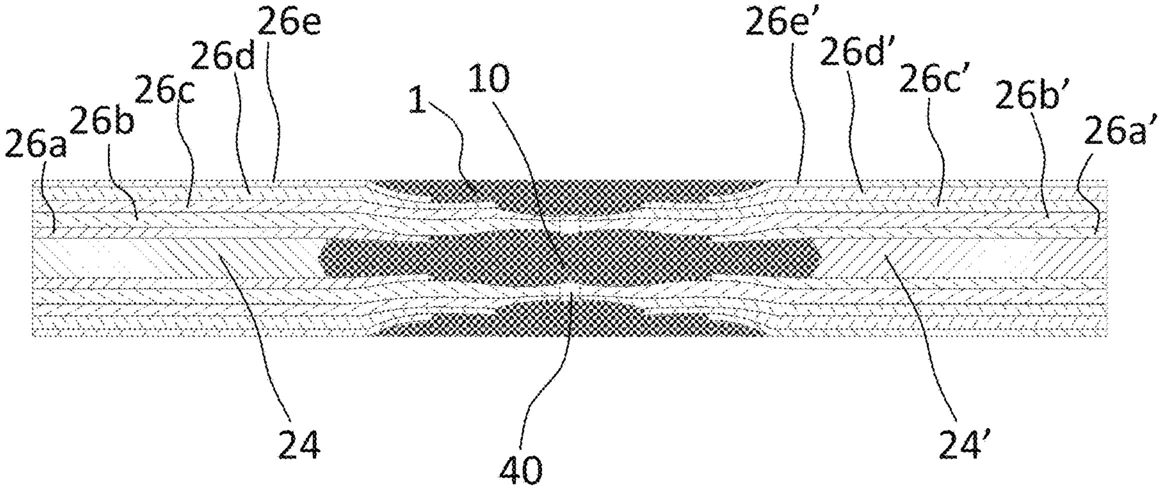
FIG. 8B is a view of the connection between the conductor joint and the conductor ends of the first and second cable shown in FIG. 8A after compressing the conductor joint.

FIGS. 8A and 8B show the connection between the conductor joint and the conductor ends of the first and second cable shown in FIG. 7 before and after compressing the conductor joint respectively. The rectangular box B in FIG. 8A is shown in FIG. 7 and the connection between the conductor joint and the conductor ends of the first and second cable is therefore having the same configuration as shown in FIG. 7.

The compression of the sleeve 1 causes the layers of stranded wires to be squeezed between the outer sleeve 1 and the inner elongated element 10. This external compression is performed directly on the sleeve by for example a hydraulic press of 200 tons (200 000 kg) or more. An internal compression of the joint is performed indirectly by the elongated element.

The resulting joint shown in FIG. 8B same outer diameter as the conductors of the first and second cable. The elongated element 10 and the layers of stranded wires 26*a-e*, 26*a*'-e' have been lengthened in the longitudinal direction during compression.

After compression, as shown in FIG. 8B, the inner longitudinal step-shaped surface of the sleeve 1, the longitudinal outer surface of the layers 26*a-e*, 26*a*'-e' of stranded wires and the outer longitudinal surface of the elongated element 10 is altered into a wave-shape/S-form in the longitudinal direction and a locked configuration/locking mechanism/ward between the layers 26*a-e*, 26*a*'-e' of stranded wires of the conductor ends of the first and second cables and the conductor joint is formed.

As can be seen from FIG. 8B air pockets 40 are formed between the terminal wall of the second layer 26*b* of stranded wires of the first cable which before compression was abutting the terminal wall of the second layer 26*b*' of stranded wires of the second cable. Air pockets are also formed between the terminal wall of third layer 26*c* of stranded wires of the first cable which before compression was abutting the terminal wall of the third layer 26*c*' of stranded wires of the second cable. Thus, the electric current passing through the conductor joint after connection is also moved in an alternating direction having a wave-shape/S-form in the longitudinal direction thereby avoiding being terminated by the air pockets 40. A threaded outer surface of the elongated element and a threaded inner surface of the sleeve is therefore advantageous for achieving a high degree of friction between the radially adjoining surfaces allowing the electric current to pass therethrough.

Example of Dimensions:

This example relates to the connection of the conductor ends of two HVDC cables comprising conductors having a center wire and five layers of stranded wires as shown in FIG. 7. The conductors of the two cables have an outer diameter of 47.3 mm and has a bending diameter of 6 m.

The largest outer diameter of the sleeve is 56 mm the longitudinal length of the sleeve, sleeve length, Ls is 90 cm. The inclination angle at each longitudinal end towards the central longitudinal axis X of the outer surface of the sleeve is 30°.

The inner diameter of the sleeve at each longitudinal end is about 47.3 mm. The inner diameter at the radial cross section of the sleeve at the lower step of the sleeve is also about 47.3 mm. The inner diameter at the radial cross section of the sleeve at the intermediate step is about 41.5 mm, while the inner diameter at the radial cross section of the sleeve at the higher step is about 33.7 mm. The longitudinal length of each step surface is about 15 mm.

The elongated element has a core rod length Lr of 117 mm, wherein the arrow shaped terminal wall at each longitudinal end of the elongated element has a longitudinal length of 3.5 mm. The tube length Lt is 60 mm. The length of the core rod at the terminal rod wall having a larger diameter than the remaining longitudinal length of the core rod is 3 mm and is having a diameter of 11.8 mm, while the remaining part of the core rod has a diameter of 11.5 mm. The diameter of the core tube is 18.4 mm.

In the preceding description, various aspects of the conductor joint according to the invention have been described with reference to the illustrative embodiment. For purposes of explanation, specific numbers, systems and configurations were set forth in order to provide a thorough understanding of the joint and its workings. However, this description is not intended to be construed in a limiting sense. Various modifications and variations of the illustrative embodiment, as well as other embodiments of the conductor joint, which are apparent to persons skilled in the art to which the disclosed subject matter pertains, are deemed to lie within the scope of the present invention.

Figure 9A:
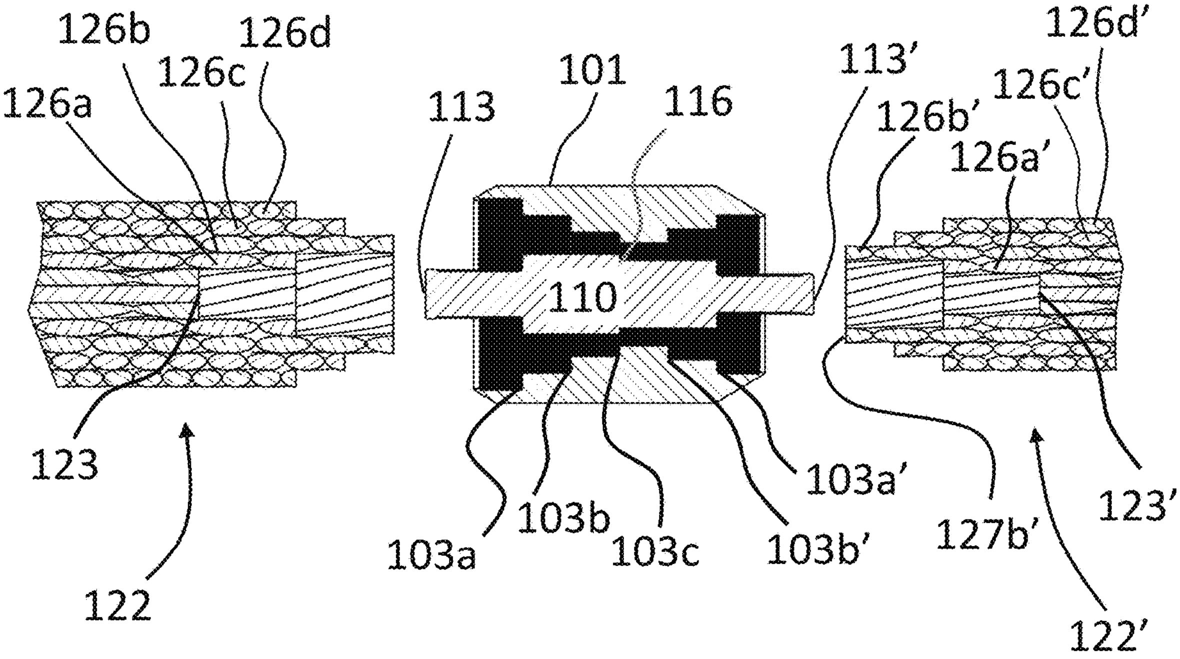
FIG. 9A is a longitudinal cross-sectional view of the conductor ends of two compacted conductors of different dimension and the conductor joint prior to joining.
Figure 9B:
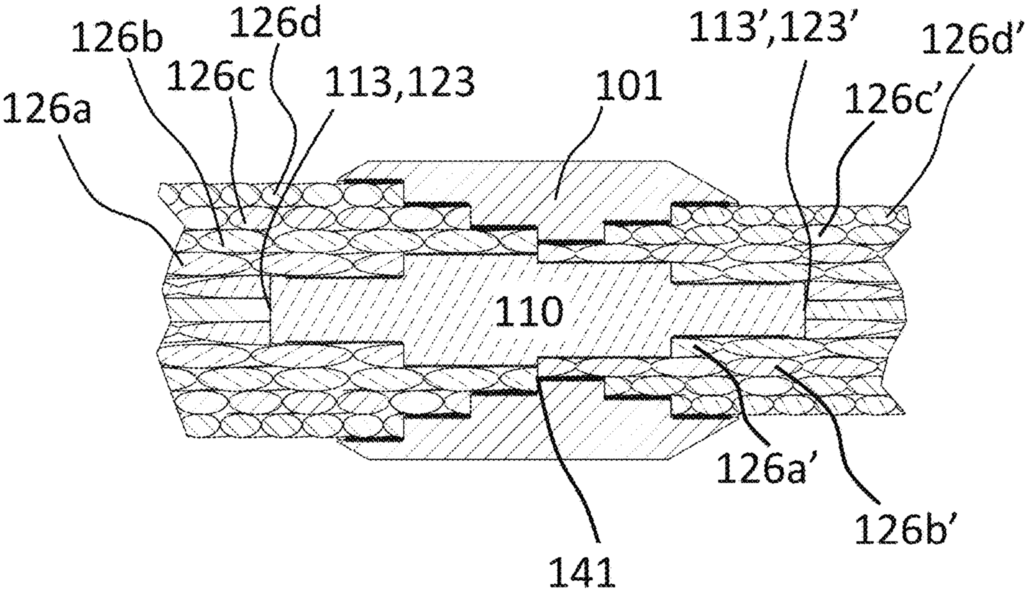
FIG. 9B is a longitudinal cross-sectional view of the conductor joint with two compacted conductors of different dimension arranged therein before compressing the conductor joint.

FIGS. 9A and 9B illustrate an embodiment wherein two conductors 122,122' with round stranded wires, as described in FIGS. 4A and 4B are jointed in a joint according to the present invention. The figures further illustrate an embodiment wherein the two conductors have different cross-section diameters. The sleeve 101 comprises two tubular internal stairs, wherein the stair on the left side comprises three steps indicated by the step walls 103*a*, 103*b* and 103*c*. The stair on the left side has two steps with the step walls 103*a*' and 103*b*'. The elongated element 110 comprises first and second terminal rod walls 113, 113' adapted to abut the terminal walls 123, 123' of the respective groups of center wires of each cable. In the illustrated embodiment the rod walls are substantially flat surfaces along the radial axis of the elongated element 110. The elongated element further comprises a third core wall 116 adapted to abut at least part of the terminal wall 127*b*' of the second layer of stranded wires. The sleeve 101 and elongated element 110 are adapted to the different dimensions of the two conductors and therefore asymmetric.

FIG. 9B illustrates the situation after the conductors have been inserted in the sleeve 101 but before the sleeve has been compressed. In this embodiment the difference the cross-section of the two conductors, and the sleeve and elongated element being adapted thereto result in an asymmetric abutment 141 where the second layers of stranded wires 126*b* and 126*b*' partly abut and partly abut the third step wall 103*c* and the third core wall 116 respectively.

Figure 10A:
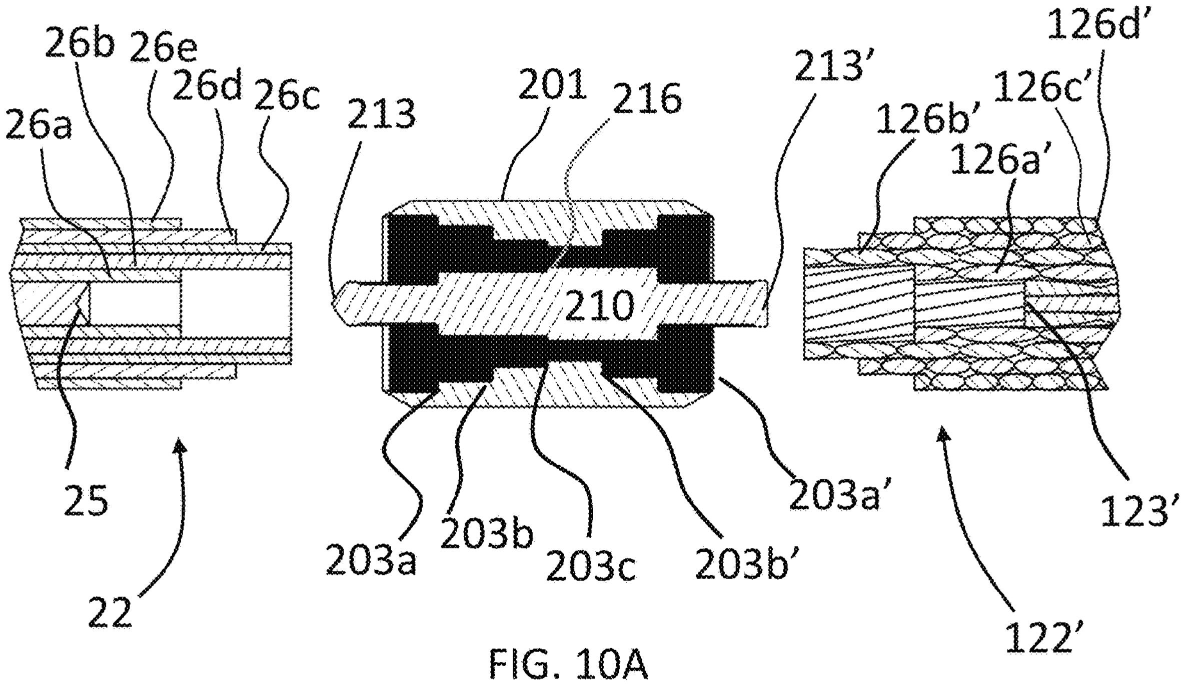
FIG. 10A is a longitudinal cross-sectional view of the conductor ends one compacted conductor and one conductor with a central wire surrounded by keystone-shaped wires of different dimension and the conductor joint prior to joining.
Figure 10B:
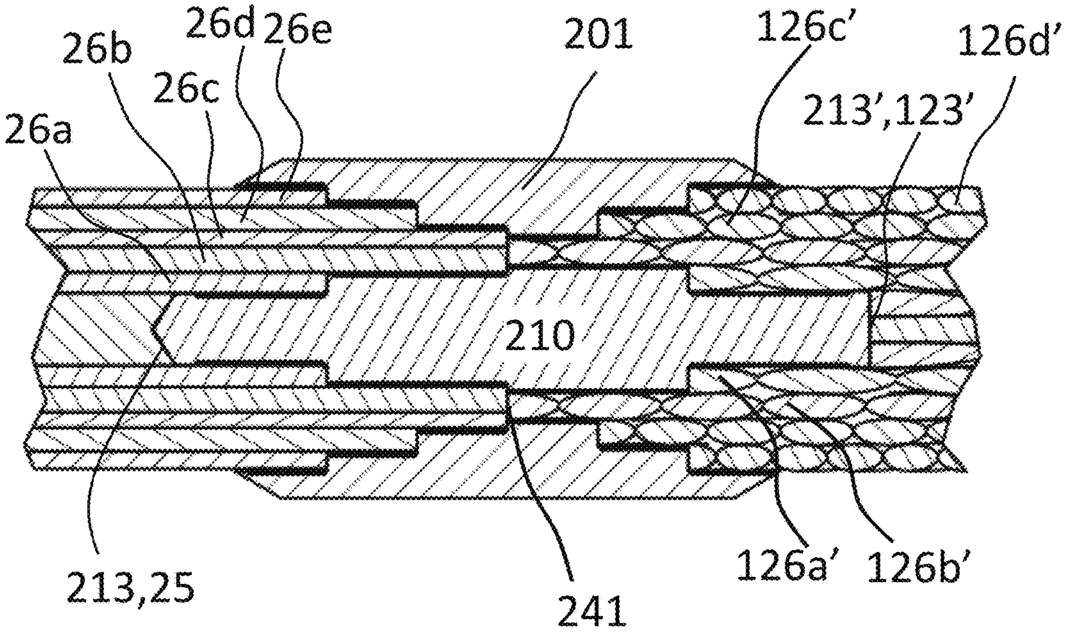
FIG. 10B is a longitudinal cross-sectional view of the conductor ends one compacted conductor and one conductor with a central wire surrounded by keystone-shaped wires of different dimension arranged therein, before compressing the conductor joint.

FIGS. 10A and 10B illustrate a further embodiment wherein one conductor 22 with a keystone configuration is jointed with a conductor 122' with round stranded wires. The sleeve 201 is adapted to the configurations of the conductors. The sleeve 201 comprises two tubular internal stairs, wherein the stair on the left side comprises three steps indicated by the step walls 203*a*, 203*b* and 203*c*. The stair on the left side has two steps with the step walls 203*a*' and 203*b*'. The elongated element 210 comprises first and second terminal rod walls 213, 213' adapted to abut the terminal wall 25 of the center wire of conductor 22 and the terminal wall 123' of the group of center wires of conductor 122' respectively. The rod wall 213 is tapered and adapted to an indentation in the terminal wall 25 of the central wire.

FIG. 10B illustrates the situation after the conductors have been inserted in the sleeve 201 but before the sleeve has been compressed. In this embodiment the difference in the configuration of the two conductors, and the sleeve and elongated element being adapted thereto result in an asymmetric abutment 241 where the second and third layer of stranded wires 26*b* and 26*c* abut the second layer or wires 126*b*' and also abuts the third step wall 203*c* and the third core wall 216 respectively.

Figure 11:
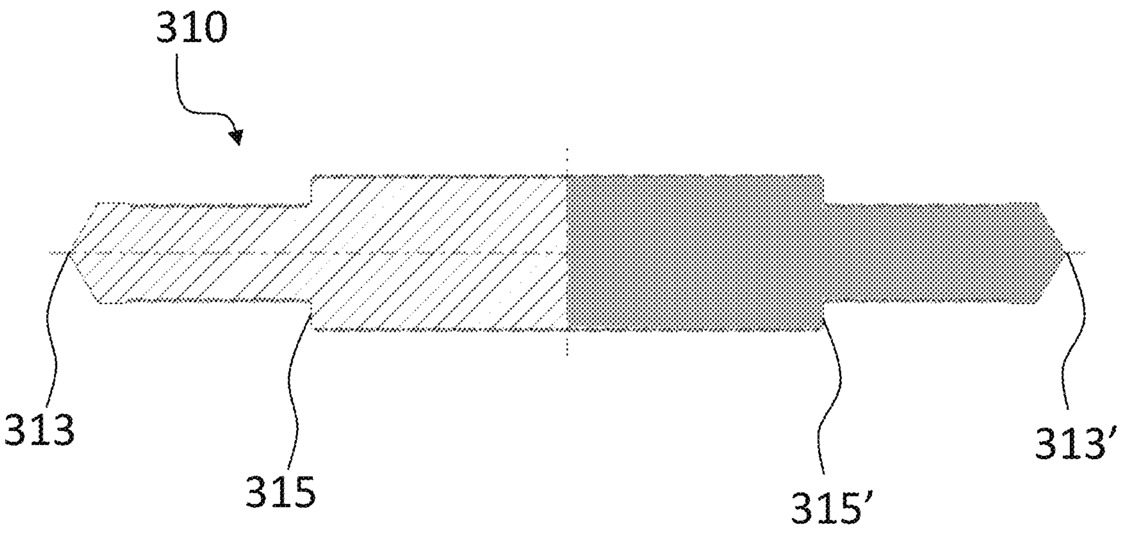
FIG. 11 is a longitudinal cross-sectional view of an elongated element comprising two end sections of different metals.

FIG. 11 illustrates a further embodiment of the elongated element 310 comprising two end sections of different metals. The terminal wall 313 of the first core wall 315 of comprises a first metal adapted to be brought in conductive connection with the conductor of a first conductor and a second terminal wall 313' and a second core wall 315' of a second metal adapted to be brought in conductive connection with the conductor of a second conductor.

LIST OF REFERENCE NUMERALS/LETTERS

| | | |
|---|---|---|
| 1 | 101, 201, 203 | Sleeve |
| 2 | | first stair |
| 2' | | second stair |
| 2a | | Lower step surface of first stair |
| 2a' | | Lower step surface of second stair |
| 2b | | Intermediate step surface of first stair |
| 2b' | | Intermediate step surface of second stair |
| 2c | | Higher step surface of first stair |
| 2c' | | Higher step surface of second stair |
| 3a | 103a, 203a | First step wall of first stair |
| 3a' | 103a', 203a' | First step wall of second stair |
| 3b | 103b, 203b | Second step wall of first stair |
| 3b' | 103b', 203b' | Second step wall of second stair |
| | 103c, 203c | Third step wall of first stair |
| 4 | | First sleeve opening |
| 4' | | Second sleeve opening |
| 5 | | Inner surface of the sleeve |
| 6 | | Outer surface of the sleeve |
| 10 | 110, 210, 310 | Elongated element |
| 12 | | Core rod |
| 13 | 113, 213, 313 | First terminal rod wall |
| 13' | 113', 213', 313' | Second terminal rod wall |
| 14 | | Core tube |
| 15 | 315 | First core wall |
| 15' | 315' | Second core wall |
| | 116, 216 | Third core wall |
| 20 | 120 | First cable |
| 20' | 120' | Second cable |
| | 121 | Group of center wires of first cable |
| | 121' | Group of center wires of second cable |
| 22 | 122 | Conductor end of first cable |
| 22' | 122' | Conductor end of second cable |
| | 123 | Terminal wall of center wires of first cable |
| | 123' | Terminal wall of center wires of second cable |
| 24 | | Circular center wire of first cable |
| 24' | | Circular center wire of second cable |
| 25 | | Terminal wall of center wire of first cable |
| 25' | | Terminal wall of center wire of second cable |
| 26 | 126 | Layer of stranded wires |
| 26' | 126' | Layer of stranded wires |
| 26a | 126a | First layer of stranded wires of first cable |
| 26a' | 126a' | First layer of stranded wires of second cable |
| 26b | 126b | Second layer of stranded wires of first cable |
| 26b' | 126b' | Second layer of stranded wires of second cable |
| 26c | 126c | Third layer of stranded wires of first cable |
| 26c' | 126c' | Third layer of stranded wires of second cable |
| 26d | 126d | Fourth layer of stranded wires of first cable |
| 26d' | 126d' | Fourth layer of stranded wires of second cable |
| 26e | | Fifth layer of stranded wires of first cable |
| 26e' | | Fifth layer of stranded wires of second cable |
| 27a | 127a | Terminal wall of first layer of stranded wires of first cable |
| 27a' | 127a' | Terminal wall of first layer of stranded wires of second cable |
| 27b | 127b | Terminal wall of second layer of stranded wires of first cable |
| 27b' | 127b' | Terminal wall of second layer of stranded wires of second cable |
| 27c | 127c | Terminal wall of third layer of stranded wires of first cable |
| 27c' | 127c' | Terminal wall of third layer of stranded wires of second cable |
| 27d | 127d | Terminal wall of fourth layer of stranded wires of first cable |
| 27d' | 127d' | Terminal wall of fourth layer of stranded wires of second cable |
| 27e | | Terminal wall of fifth layer of stranded wires of first cable |
| 27e' | | Terminal wall of fifth layer of stranded wires of second cable |
| 28 | 128 | Insulation layer of first cable |
| 28' | 128' | Insulation layer of second cable |
| 29 | 129 | Stranded wire of first cable |
| 29' | 129' | Stranded wire of second cable |
| 30 | 130 | Lead barrier layer of first cable |
| 30' | 130' | Lead barrier layer of second cable |
| 32 | | Polyethylene layer of first cable |
| 32' | | Polyethylene layer of second cable |
| 34 | | Strengthening layer of first cable |
| 34' | | Strengthening layer of second cable |
| 36 | 136 | Armor layer of first cable |

-continued

| | | |
|---|---|---|
| 36' | 136' | Armor layer of second cable |
| 38 | 138 | Outer protective layer of first cable |
| 38' | 138' | Outer protective layer of second cable |
| 40 | | Air pocket |
| | 141, 241 | Asymmetric abutment |
| X | | Longitudinal axis of the sleeve |
| Y | | Radial axes of the sleeve |

The invention claimed is:

1. A conductor joint for connecting a conductor end of a first cable with a conductor end of a second cable, wherein the conductor joint comprises a tubular longitudinal sleeve of a sleeve length Ls having a sleeve opening at each longitudinal end with an inner diameter allowing insertion of the conductor ends to be connected and an elongated element arranged within the sleeve openings, wherein the elongated element comprises an electrically conductive core rod having a core rod length Lr and a terminal rod wall at each longitudinal end, wherein the electrically conductive core rod extends between the conductor end of the first cable and the conductor end of the second cable so that the first cable is electrically connected to the second cable via the electrically conductive core rod and the electrically conductive core rod substantially fills the space between the opposed conductor ends, wherein the electrically conductive core's rod length Lr is longer than the sleeve's length Ls in the axial direction such that each interface between the core rod and the conductor ends is located axially beyond the corresponding axial end of the sleeve.

2. The conductor joint according to claim 1, wherein the elongate element is arranged concentrically within the sleeve.

3. The conductor joint according claim 1, wherein the sleeve comprises an inner surface shaped as two tubular stairs mirrored around a radial cross-sectional area at a longitudinal center of the sleeve, wherein each stair comprises, a lower step surface at the nearest sleeve opening oriented along a longitudinal axis of the sleeve, a higher step surface at the longitudinal center and a step wall arranged between the lower step surface and the higher step surface oriented along a radial cross-sectional direction of the sleeve.

4. The conductor joint according to claim 1, wherein the elongated element further comprises a core tube concentrically arranged around the core rod having a core tube length Lt shorter than the core rod length Lr and wherein the diameter of the core tube is larger than the diameter of the core rod, and a core wall arranged between the core rod and the core tube oriented along a radial orientation of the elongated element.

5. The conductor joint according to claim 4, wherein the radial distance of the core wall is equal or near equal to a radial thickness of a first layer of a stranded wire immediately adjacent to a center wire of the conductor ends to be connected.

6. The conductor joint according to claim 1, wherein the step wall is at the lower step surface end, distal to the nearest sleeve opening, and wherein each stair further comprises an intermediate step surface and an intermediate step wall arranged between the step wall and the higher step surface.

7. The conductor joint according to claim 1, wherein the sleeve length Ls is equal to or longer than the diameter of at least one of conductors ends.

8. The conductor joint according to claim 1, wherein for each stair, the lengths of each step surface along a longitudinal axis of the sleeve are equal or near equal.

9. The conductor joint according to claim 1, wherein the radial distance of the first step wall of the sleeve is equal or near equal to the radial thickness of an outermost layer of stranded wires.

10. The conductor joint according to claim 1, wherein a length of the core rod at the terminal rod wall at least one longitudinal end has a larger diameter than the remaining longitudinal length of the core rod.

11. The conductor joint according to claim 1 wherein, for each stair, each step surface has a length along a longitudinal axis of the sleeve which is at least twice a radial height of the step wall.

12. The conductor joint according to claim 1, wherein more than 50% of the outer surface of the elongated element is threaded.

13. The conductor joint according to claim 1, wherein more than 50% of the inner surface of the sleeve is threaded.

14. A method for connecting a conductor end of a first cable with a conductor end of a second cable using a conductor joint, wherein the conductor ends of the first and second cable comprise a circular center wire comprising a terminal wall or a group of center wires comprising a terminal wall, a plurality of concentrically layers of stranded wires surrounding the circular center wire wherein each layer of stranded wires comprising a terminal wall, and wherein the conductor joint comprises a tubular longitudinal sleeve of a sleeve length Ls having a sleeve opening at each longitudinal end with an inner diameter allowing insertion of the conductor ends to be connected, an elongated element arranged within the sleeve openings, wherein the elongated element comprises an electrically conductive core rod having a core rod length Lr and a terminal rod wall at each longitudinal end, wherein a diameter of the core rod is equal or smaller than the diameter of a center wire or group of center wires of one or both of the conductor ends, the core rod length Lr being longer than the sleeve length Ls in the axial direction such that each interface between the core rod and the conductor ends is located axially beyond the corresponding axial end of the sleeve, wherein the method comprises the following steps i) inserting the conductor end of the first cable into one sleeve opening such that one of the two terminal rod walls abuts or is adjacent to the terminal wall of the circular central wire of the first cable or such that one of the two terminal rod walls abuts or is adjacent to the terminal wall of the group of center wires of the first cable and ii) inserting the conductor end of the second cable into the other sleeve opening such that the other terminal rod wall abuts or is adjacent to the terminal wall of the circular central wire of the second cable or such that the other terminal rod wall abuts or is adjacent to the terminal wall of the group of center wires of the second cable, so that the first cable is electrically connected to the second cable via the electrically conductive core rod that substantially fills the space between the opposed conductor ends, iii) compressing said sleeve radially towards the elongated element, thereby locking the conductor joint to the conductor ends.

15. The method according to claim 14, wherein step iii) involves circularly compressing the sleeve until the diameter of a jointed section is the same or similar to the diameter of one of the conductor ends of the first and second cable.

* * * * *